US010334223B2

(12) United States Patent
Rabii et al.

(10) Patent No.: US 10,334,223 B2
(45) Date of Patent: Jun. 25, 2019

(54) SYSTEM AND METHOD FOR MULTI-VIEW VIDEO IN WIRELESS DEVICES

(71) Applicant: QUALCOMM Incorporated, San Diego, CA (US)

(72) Inventors: Khosro Mohammad Rabii, San Diego, CA (US); Vijay Naicker Subramaniam, San Diego, CA (US); Fawad Shaukat, San Diego, CA (US); Shivakumar Balasubramanyam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 258 days.

(21) Appl. No.: 14/610,677

(22) Filed: Jan. 30, 2015

(65) Prior Publication Data

US 2016/0227191 A1 Aug. 4, 2016

(51) Int. Cl.
| H04B 7/00 | (2006.01) |
| H04N 13/194 | (2018.01) |
| H04N 13/161 | (2018.01) |
| H04W 24/08 | (2009.01) |
| H04N 21/61 | (2011.01) |

(52) U.S. Cl.
CPC ......... *H04N 13/194* (2018.05); *H04N 13/161* (2018.05); *H04W 24/08* (2013.01); *H04N 21/6131* (2013.01)

(58) Field of Classification Search
CPC ........... H04N 13/0059; H04N 13/0048; H04N 21/6131; H04W 24/08
See application file for complete search history.

(56) References Cited

U.S. PATENT DOCUMENTS

| 8,156,238 B2 | 4/2012 | Kobayashi |
| 9,131,279 B2 | 9/2015 | Raveendran et al. |

(Continued)

FOREIGN PATENT DOCUMENTS

| CN | 103795996 A | 5/2014 |
| WO | WO-2011017470 A1 | 2/2011 |
| WO | WO-2011081646 A1 | 7/2011 |
| WO | WO-2012009695 A1 | 1/2012 |
| WO | WO-2013023345 A1 | 2/2013 |

OTHER PUBLICATIONS

International Search Report and Written Opinion—PCT/US2015/065587—ISA/EPO—dated Mar. 22, 2016.

(Continued)

*Primary Examiner* — Howard D Brown, Jr.
(74) *Attorney, Agent, or Firm* — Knobbe, Martens, Olson & Bear, LLP

(57) ABSTRACT

This disclosure provides systems, methods, and apparatuses for providing multi-view (MV) video data via a wireless network. For example, the apparatus may include a processor configured to determine at least a first channel quality estimate of a communication channel of the wireless network used to transmit first MV video data. The apparatus may include an input/output (I/O) controller configured to receive a binocular disparity error estimate indicative of a rendering of the first MV video data. The processor may be configured to determine whether to continue to at least one of capture, encode, and/or transmit MV video data based at least in part on the first channel quality estimate and/or the binocular disparity error estimate.

20 Claims, 8 Drawing Sheets

(56) References Cited

U.S. PATENT DOCUMENTS

| | | |
|---|---|---|
| 9,406,132 B2 | 8/2016 | Martinez et al. |
| 2012/0127274 A1 | 5/2012 | Kim |
| 2012/0140033 A1* | 6/2012 | Tabor ................ G02B 27/2264 348/43 |
| 2012/0169722 A1 | 7/2012 | Hwang et al. |
| 2012/0200668 A1 | 8/2012 | Maruyama et al. |
| 2013/0235152 A1 | 9/2013 | Hannuksela et al. |
| 2014/0170985 A1* | 6/2014 | Raghavan ............ H04W 24/02 455/67.13 |
| 2014/0184743 A1* | 7/2014 | Chen .................. H04N 13/194 348/43 |

OTHER PUBLICATIONS

Bento D.M., et al., "A QoS Solution for Three-Dimensional Full-HD H.264/MVC Video Transmission over IP Networks," IEEE Seventh Iberian Conference on Information Systems and Technologies (CISTI 2012), Jun. 2012, pp. 1-6.

De Pinho João, "Automatic Adaptation of Views in 3d Applications," Jul. 22, 2013, pp. 1-48.

Wang F., et al., "Efficient Early Direct Mode Decision for Multi-View Video Coding," Signal Processing: Image Communication, Aug. 2013, pp. 736-744, vol. 28 (7).

* cited by examiner

SYSTEM AND METHOD FOR MULTI-VIEW VIDEO IN WIRELESS DEVICES

BACKGROUND

Technological Field

This disclosure is related to the field of video coding and compression. In particular, the present disclosure is related to the transmission and scaling of multi-view (or multi-layer) video data.

Related Art

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, smartphones, video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

As "multi-view (MV)" video and "multi-layer" video (often referred to interchangeably), including three-dimensional and/or stereoscopic video, has become more prevalent in consumer video devices, the desire for mobile viewing and transmission of multi-view video has increased. Certain technologies have also allowed wireless transmission of video from one device to another via a network or in a peer-to-peer architecture. MV video may be transmitted from a source device to a destination device via wireless local area network (WLAN) carrier(s) (e.g., in accordance with one or more of the IEEE 802.11 standards) and/or wireless wide area network (WWAN) carrier(s) (e.g., cellular). The delivery of such MV video, from the source device to the destination device, over the WLAN and/or the WWAN may depend, for example, on the quality of service (QoS) of the respective wireless network carrier(s). As used herein, wireless networks may refer to WLANs, WWANs, or the like.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In accordance with one or more aspects of the present disclosure, there is provided an apparatus/device for transmission of multi-view (MV) video data via a wireless network. For example, the apparatus may include at least one processor configured to determine at least a first channel quality estimate of a communication channel of the wireless network used to transmit first MV video data. The apparatus may also include an input/output (I/O) controller configured to receive a binocular disparity error estimate indicative of a rendering of the first MV video data. The at least one processor may be further configured to determine whether to continue to at least one of capture, encode, and/or transmit MV video data based at least in part on the first channel quality estimate and/or the binocular disparity error estimate.

In related aspects, the disclosure provides an apparatus that includes, for example, means for determining at least a first channel quality estimate of a communication channel of the wireless network used to transmit first MV video data. The apparatus may also include means for receiving a binocular disparity error estimate indicative of a rendering of the first MV video data. The apparatus may further include means for determining whether to continue to at least one of capture, encode, and/or transmit MV video data based at least in part on the first channel quality estimate and/or the binocular disparity error estimate.

Another aspect of the disclosure provides a method for transmission of MV video data via a wireless network. For example, the method may involve determining at least a first channel quality estimate of a communication channel of the wireless network used to transmit first MV video data. The method may also involve receiving a binocular disparity error estimate indicative of a rendering of the first MV video data. The method may further involve determining whether to continue to at least one of capture, encode, and/or transmit MV video data based at least in part on the first channel quality estimate and/or the binocular disparity error estimate.

Another aspect of the disclosure provides a non-transitory computer readable storage medium having stored thereon instructions that, when executed, cause a processor of a device to: determine at least a first channel quality estimate of a communication channel of the wireless network used to transmit first MV video data; receive a binocular disparity error estimate indicative of a rendering of the first MV video data; and determine whether to continue to at least one of capture, encode, and/or transmit MV video data based at least in part on the first channel quality estimate and/or the binocular disparity error estimate.

In accordance with one or more aspects of the present disclosure, there is provided an apparatus/device for receiving MV video data via a wireless network. For example, the apparatus may include an I/O controller configured to receive first MV video data via a communication channel of the wireless network. The apparatus may further include at least one processor configured to: determine at least a first channel quality estimate of the communication channel; determine a binocular disparity error estimate indicative of a rendering of the first MV video data; and determine whether to continue to at least one of receive, decode, and/or render MV video data based at least in part on the first channel quality estimate and/or the binocular disparity error estimate.

In related aspects, the disclosure provides an apparatus that includes, for example, means for receiving first MV video data via a communication channel of the wireless network. The apparatus may also include means for determining at least a first channel quality estimate of the communication channel, and means for determining a binocular disparity error estimate indicative of a rendering of the first MV video data. The apparatus may further include means for determining whether to continue to at least one of receive, decode, and/or render MV video data based at least in part on the first channel quality estimate and/or the binocular disparity error estimate.

Another aspect of the disclosure provides a method for receiving of MV video data via a wireless network. For example, the method may involve receiving first MV video data via a communication channel of the wireless network. The method may also involve determining at least a first channel quality estimate of the communication channel, and determining a binocular disparity error estimate indicative of a rendering of the first MV video data. The method may further involve determining whether to continue to at least one of receive, decode, and/or render MV video data based at least in part on the first channel quality estimate and/or the binocular disparity error estimate.

Another aspect of the disclosure provides a non-transitory computer readable storage medium having stored thereon instructions that, when executed, cause a processor of a device to: receive first MV video data via a communication channel of the wireless network; determine at least a first channel quality estimate of the communication channel; determine a binocular disparity error estimate indicative of a rendering of the first MV video data; and determine whether to continue to at least one of receive, decode, and/or render MV video data based at least in part on the first channel quality estimate and/or the binocular disparity error estimate.

DETAILED DESCRIPTION

Figure 1:
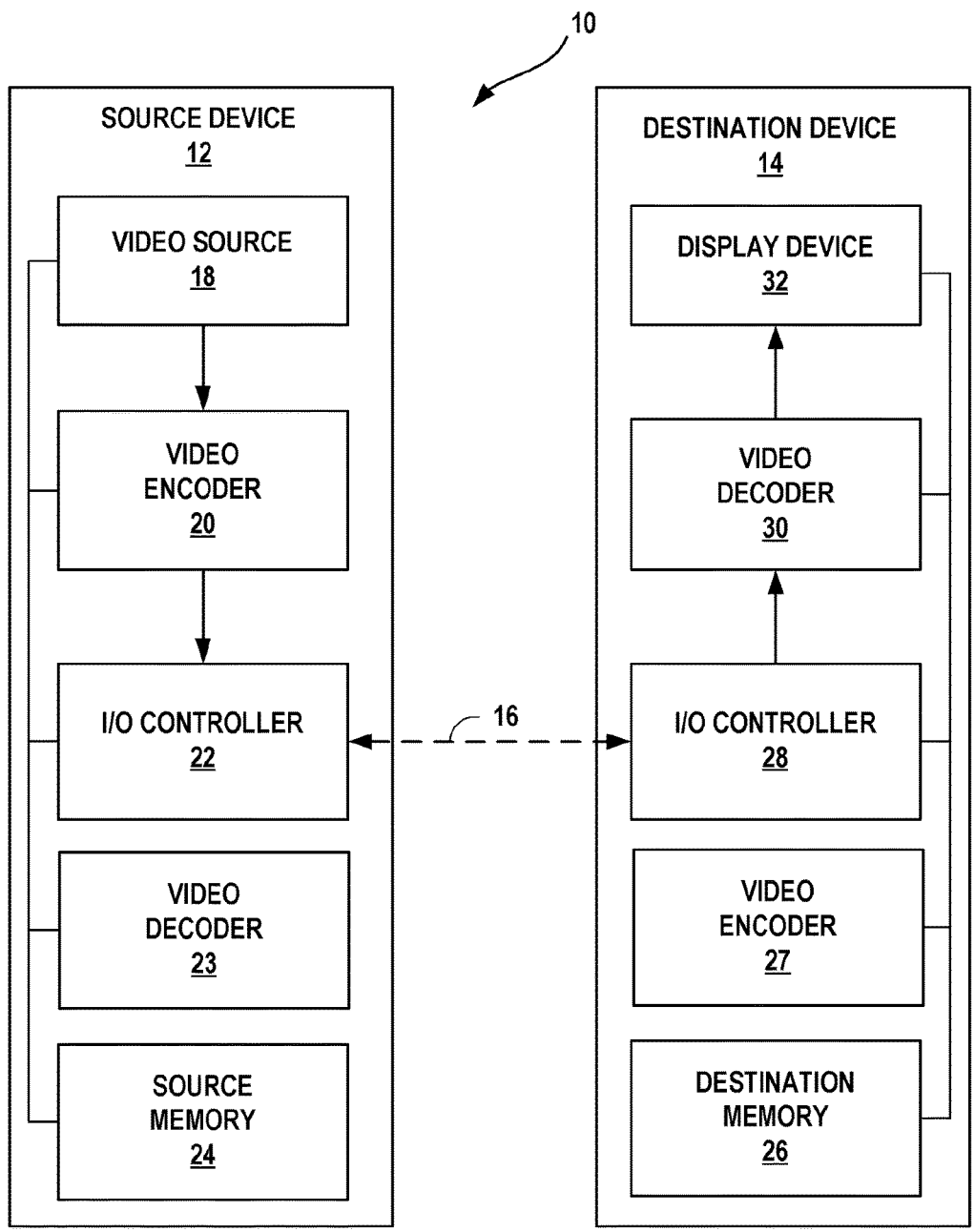
FIG. 1 shows a mobile device receiving multi-view (MV) video data from a video capture device over a wireless network, in accordance with an exemplary embodiment.

Multimedia synchronization and transfer of high-fidelity coded video data over wireless networks may be limited by bandwidth, transmission distance, and/or interference, among other factors. In this context, there remains a need for a source device to determine when to capture, encode, and/or transmit multi-view (MV) video data, versus capturing, encoding, and/or transmitting monoscopic video data. Such a determination may be made based on channel quality estimate(s) of a communication channel of a wireless network used to transmit the MV video data and/or based on information from a destination device. Similarly, there remains a need for the destination device to know when to receive, decode, and/or render MV video data versus monoscopic video data.

The techniques described herein generally relate to MV or multi-layer video coding, such as, for example, three-dimensional (3D) video coding, stereoscopic video coding, scalable video coding, etc. For example, the techniques may be performed with or within the High Efficiency Video Coding (HEVC) standard, as well as with its multi-view (or multi-layer) extensions such as a Multi-view Video Coding extension to HEVC (MV-HEVC), a Multi-view plus depth Video Coding extension to HEVC (3D-HEVC), or a Scalable Video Coding (SVC) extension to HEVC (SHVC). The techniques of this disclosure, however, are not limited to any particular video coding standard, and may also or alternatively be used with other extensions to HEVC, other multi-view coding standards (with or without a depth component) and/or other multi-layer video standards. In addition, techniques of this disclosure, as described below, may be applied independently or in combination.

A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. Moreover, the terms inter-view prediction and inter-layer prediction may interchangeably refer to prediction between multiple layers and/or views of video data. In addition, a multi-layer codec (also referred to as a multi-layer video coder or multi-layer encoder-decoder) may jointly refer to a MV codec or a scalable codec (e.g., a codec configured to encode and/or decode video data using MV-HEVC, 3D-HEVC, SHVC, or another multi-layer coding technique). Video encoding and video decoding may both generally be referred to as video coding.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram that illustrates an example system 10 that may utilize techniques in accordance with aspects described in this disclosure. As used described herein, the term "video coder" refers generically to both video encoders and/or video decoders, and the terms "video coding" or "coding" may refer generically to video encoding and/or video decoding.

As shown in FIG. 1, the system 10 may include a source device 12 and a destination device 14. The source device 12 may generate encoded video data (also referred to as simply, "video data"). The destination device 14 may decode the encoded video data in order to render or display the decoded video data (i.e., reconstructed video data) for viewing by a user or for other use(s). The source device 12 and destination device 14 may each be equipped (e.g., configured or adapted) for wireless communication. The source device 12 may provide (e.g., transmit or communicate) the video data to the destination device 14 via a communication channel 16 of a wired and/or wireless network(s).

The source device 12 and the destination device 14 may respectively include a wide range of devices, including desktop computers, notebook (e.g., laptop) computers, tablet computers, set-top boxes, telephone handsets (e.g., smartphones), televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like.

In some embodiments the source device 12 may be equipped with a video source 18, which may be, for example, a video capture device. Accordingly, the source device 12 may further comprise various types of video cameras such as a hand-held camera unit, a head-mounted device (HMD) a webcam incorporated in, or used in combination with, a computer, or a smartphone camera. For example, the source device 12 may be a remotely controlled device (e.g., a remotely piloted aircraft or drone, a land-based vehicle, a robot, a surveillance device, etc.), and the video source 18 may include video capture sensor(s) on the remotely controlled device.

Similarly, it is noted that the destination device 14 may be a personal digital assistant (PDA), laptop or desktop computer, tablet computer, digital media player, video gaming device, video game console, 3D display panel, 3D glasses, etc. that includes wireless and/or wired communication component(s).

The video source 18 may comprise one or more internal video sensors such as a CCD (charge-coupled device) or CMOS (complementary metal-oxide-semiconductor) camera or other similar video sensor. The video source 18 may generate computer graphics-based data or a combination of live video, archived video, and/or computer-generated video as the source video (i.e. the video data). In some embodiments, the video source 18 may comprise multiple video sensors or video data sources as may be found in an MV video capture device, such as, for example, a stereoscopic video capture device or a 3D video capture device.

The source device 12 may further include a video encoder 20 in communication with the video source 18, and may also include a video decoder 23. The video encoder 20 may be configured to apply various techniques for coding a bitstream including video data conforming to multiple wired or wireless standard(s). The video encoder 20 may encode video data into one or more of a variety of formats and/or utilize various compression techniques, such as those described in the standards defined by MPEG-2, MPEG-4, ITU-T H.263, ITU-T H.264/MPEG-4, Part 10, Advanced Video Coding (AVC), HEVC, etc. The techniques of this disclosure, however, are not limited to any particular coding standard. Although not shown in FIG. 1, the video encoder 20 may be integrated with an audio encoder and may include appropriate MUX-DEMUX units, or other hardware and software, to handle encoding of both audio data and video data in a single or shared data stream or separate data streams. For example, the MUX-DEMUX units may conform to the ITU H.223 multiplexer protocol, the user datagram protocol (UDP), or similar applicable protocol(s). Further details regarding the video decoder 23 are provided below with reference to a video decoder 30 of destination device 14.

The source device 12 may further comprise an input/output (I/O) controller 22 in communication with the video encoder 20. The I/O controller 22 may receive encoded video data from the video encoder 20 for transmission to the destination device 14. The I/O controller 22 may comprise a central processing unit (CPU) and/or a plurality of processors for directing the processes within the source device 12. The I/O controller 22 may comprise a wired and/or wireless interface for the transmission, via the communication channel 16, of the video data captured and/or accessed by the video source 18 and encoded by the video encoder 20. The I/O controller 22 may further communicate with the destination device 14 as required for proper rate or content adaptation of the transmitted video data as described in further detail below.

The source device 12 may further comprise a source memory 24 in communication with one or more of the video source 18, video encoder 20, the I/O controller 22, and/or the video decoder 23. The source memory 24 may comprise a computer-readable storage medium capable of storing or buffering raw video data captured and/or accessed by the video source 18, encoded video data from the video encoder 20, decoded video data from the video decoder 23, and/or video data buffered or queued for transmission via the I/O controller 22. As used herein, raw video data may refer to video data that is not encoded and/or compressed, for example, by the video encoder 20.

The I/O controller 22 of the source device 12 may transmit the encoded video data to the destination device 14 via the communication channel 16. The encoded video data may be modulated according to a communication standard, such as a wireless communication protocol, and transmitted to destination device 14. The communication medium may be wireless (e.g., a radio frequency (RF) spectrum) and/or wired (e.g., physical transmission line).

In accordance with one or more aspects of the present disclosure, the source device 12 and the destination device 14 may exchange commands and/or share information regarding a first wireless network over which the communication channel 16 enables communication. More specifically, such commands and information may relate to the performance, as indicated by the quality of service (QoS), of the first wireless network, and may be useful for adapting the content (e.g., the version of the content) and/or the transmission (e.g., the transmission rate) of the video data sent to the destination device 14. Here, QoS may relate to, for example, throughput, latency, spectral efficiency, data rate, interference, and/or some other suitable parameter indicative of the performance of the first wireless network.

In certain embodiments, the source device 12 may further be capable of determining operating conditions and/or performance characteristics of the communication channel 16 (explained in further detail below with reference to FIG. 4). For example, the source device 12 may be configured to determine data traffic on communication channel 16 or other conditions such as, for example, interference, signal-to-noise ratio, and/or other channel quality metrics (e.g., QoS metrics, such as data rate, delay, delay-violation probability, packet-loss probability, actual packet delivery time, packet latency, packet flow regularity, etc.). The source device 12 may be further configured to communicate such conditions and/or channel quality metrics (e.g., via I/O controller 22 communicating on communication channel 16) to the destination device 14.

In related aspects, the commands and/or information regarding the performance of the first wireless network may be based on the operating conditions and/or performance characteristics of communication channel 16 and/or other communication channels of the first wireless network. In further related aspects, the first wireless network may be a wireless local area network (WLAN) (e.g., a WLAN operating in accordance with one or more of the IEEE 802.11 standards), a wireless wide area network (WWAN) (e.g., a cellular network operating in accordance with 3rd Generation Partnership Project (3GPP) Long Term Evolution (LTE), LTE-Advanced (LTE-A), or the like), or a heterogeneous wireless network (HWN).

In yet further related aspects, the source device 12 and the destination device 14 may exchange the commands and/or information regarding the performance of the first wireless network via the communication channel 16 and/or other communication channel(s) of the first wireless network. In still further related aspects, the source device 12 and the destination device 14 may exchange the commands and/or information regarding the performance of the first wireless network via a separate communication channel of a second wireless network (e.g., a WLAN or WWAN), a personal area network (PAN), etc.

The communication channel 16 may carry output video data from the I/O controller 22 of the source device 12 to an I/O controller 28 of the destination device 14. The I/O controller 28 may provide the same functionality of the I/O controller 22. The I/O controller 28 may comprise a CPU and/or one or more processors that may direct the processes within the destination device 14. In an embodiment, the destination device 14 may further send and/or receive commands and information (e.g., via the I/O controller 28) to and/or from the source device 12. The I/O controller 28 may further receive information, for example, via the communication channel 16, and the received information may include syntax information defined by video encoder 20 that includes syntax elements that relate to the processing of blocks and other coded units of the video data. The destination device 14 may determine certain condition(s) (e.g., QoS) on (or associated with) the communication channel 16 and communicate metrics associated with (or based on) the channel condition(s) within the destination device 14 and/or to the source device 12.

The destination device 14 may further include a video decoder 30 in communication with the I/O controller 28, and may also include a video encoder 27. The video decoder 30 may receive the encoded video data via the I/O controller 28 and may decode the received video data for use (or further transmission) by the destination device 14. The video decoder 30 may utilize the same or similar coding techniques as, but complementary to, the video encoder 20 so as to efficiently decode and utilize the received video data. Further details regarding the video encoder 27 are provided above with reference to the video encoder 20 of the source device 12.

The destination device 14 may further comprise a display device 32 in communication with the video encoder 30. The display device 32 may display the decoded video data to the user. The display device 32 may generally comprise any of a variety of display devices such as a cathode ray tube (CRT), a liquid crystal display (LCD), a plasma display, an organic light emitting diode (OLED) display, or another type of display or video projection device. In an embodiment, the display device 32 may comprise, for example, a monitor or the video display on a handheld mobile video device or a smartphone.

The destination device 14 may further comprise a destination memory 26, which may be in communication with one or more of the video encoder 27, the I/O controller 28, the video decoder 30, and/or the display device 32. The destination memory 26 may comprise a computer-readable storage medium for storing and/or buffering the video data received via the communication channel 16. The destination device 14 may use the decoded video data to display content on the display device 32 and/or store the decoded video data within the destination memory 26 for later use or playback.

Figure 2:
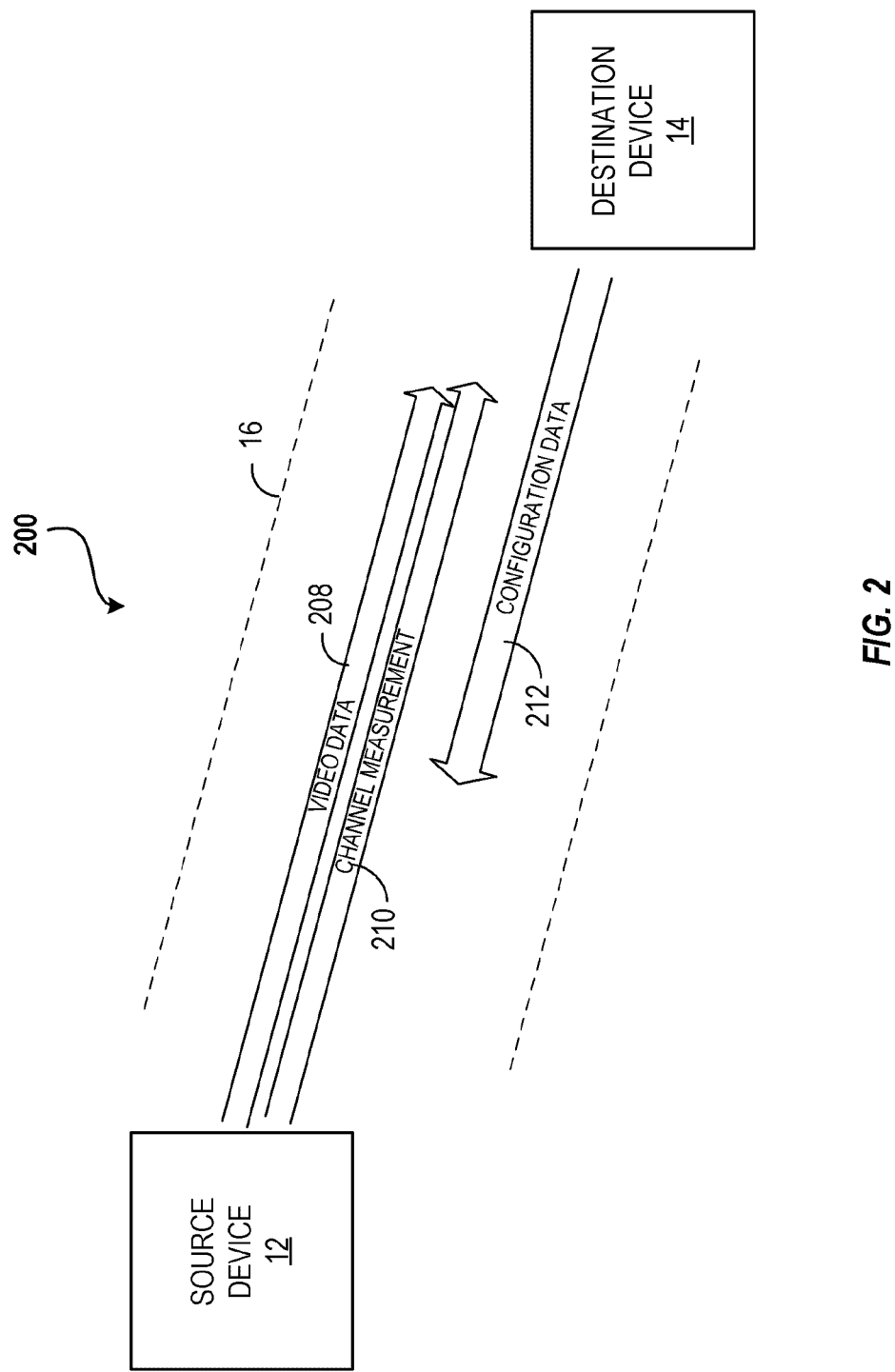
FIG. 2 is a functional block diagram of a MV video system, in accordance with aspects of the present disclosure.

With reference to FIG. 2, there is provided an exemplary graphical representation of a system 200 that includes the source device 12 and the destination device 14 that are in communication with each other via the communication channel 16. For example, a user may utilize the source device 12 to capture video data 208. The video data 208 may be captured, for example, as monoscopic video data or multi-view (or multi-layer) video data. As previously noted, this disclosure may interchangeably refer to a layer and a view of video data. That is, a view of video data may be referred to as a layer of video data, and a layer of video data may be referred to as a view of video data. In other words, in this disclosure, a reference to multi-view (MV) video data should be understood to also include a reference to multi-layer video data and a reference to multi-layer video data should be understood to also include a reference to MV video data. In the present example, the destination device 14 may receive the video data 208 from the source device 12 via the communication channel 16 of the first wireless network. "Communication channels", such as the communication channel 16, may alternatively be referred to as "connections" or "links".

For example, the channel 16 may comprise a WLAN connection or another suitable communication channel operating in accordance with a point-to-point, peer-to-peer, or device-to-device communication technology and/or communication standard. The channel 16 may periodically experience interference. Such interference may interrupt transmission and/or degrade channel quality or the QoS attainable via the channel 16, and consequently, interrupt transmission and/or degrade the quality of the transmission of video data 208. As a non-limiting example, a user may be in an environment with few wireless devices (i.e., a low-density device environment) while using the source device 12 to capture video data 208 (e.g., MV video data). Because the source device 12 and the destination device 14 are in proximity of only a few wireless devices, the degree of interference resulting from operations of other wireless devices on the same and/or different wireless networks may be minimal. Accordingly, the video data 208 may be transmitted at or near the full capacity of the communication channel 16.

In the same example, if a user of the source device 12 and/or the destination device 14 encounters a high-density environment (e.g., an area or a location with many devices communicating over the same wireless network and/or devices communicating on different wireless networks), communication between the source device 12 and the destination device 14 pair via the communication channel 16 may be degraded due to the interference resulting from operation of the other wireless device(s) within the environment In the alternative, or in addition, the interference may result from other devices, wireless or otherwise, operating in certain frequency ranges (e.g., in the 2.4 GHz or 5.0 GHz band) in the environment and/or building and construction materials in the environment. In such circumstances, the video data 208 may exceed the available transmission capacity due to loading of the communication channel 16 by competing devices and/or the communication channel 16 may exhibit poor QoS due to interference caused by other devices (operating within the environment) on the same and/or different wireless networks. Such interference and/or loading of the communication channel 16 may delay delivery of packets of the video data 208 to the destination and/or cause packets of the video data to go un-delivered to the destination device 14, thereby resulting in a degradation of processing at the video decoder 30 and/or a degradation of the rendition of the video data 208 at the destination device 14. For example, such interference and/or loading of the communication channel may result in, among other problems, video jitter, asynchronous audio and video decoding as well as display at the destination device 14, and/or binocular disparity error (in the case of MV video) at the destination device 14. Binocular disparity error may be detectable at the destination device 14, for example, as distorted depth perception experienced by the user, which may negatively affect viewing of the MV video data 208.

In order to address the binocular disparity error (e.g., exceeding a disparity error threshold) and/or other problems associated with the degradation of MV video quality, the source device 12 and/or the destination device 14 may take certain actions to decrease the loading of the communication channel 16 and coordinate a transition of coding and/or transmission from MV video to monoscopic video.

In some embodiments, the source device 12 may monitor or determine the QoS that the communication channel 16 is providing to the source device 12. The source device 12 may further transmit certain channel measurement data 210, including data indicative of channel quality to the destination device 14. The destination device 14 may make decisions or determinations, instruct operations, and/or perform certain operations based on the received channel measurement data 210. For example, the destination device 14 may make, based on the channel measurement data 210 received from the source device 12, predictive decisions regarding transmission quality, such as, for example, how much of the video data 208 may be lost due to the present condition of the communication channel 16. For example, in response to determining, based on the channel measurement data 210, that the channel quality of the communication channel 16 has fallen below a level or threshold of quality acceptable to the destination device 14 for MV video data processing and/or rendering, the destination device 14 may elect to disregard (i.e., refrain from processing and/or rendering) MV video data in favor of processing and/or rendering monoscopic video data. Conversely, if the channel quality of the communication channel 16 was determined, based on the channel measurement data 210, by the destination device 14 to have risen to or above (i.e., meets or exceeds) the level or the threshold described above, the opposite process may occur at the destination device 14. Namely, the destination device 14 may transition from processing and playing back monoscopic video to processing (e.g., decoding) and playing back (i.e., rendering) MV video data. This process is discussed in more detail in connection with FIGS. 3A-B.

In some embodiments, the destination device 14 may separately (i.e., without input from the source device 12) monitor or determine QoS of the communication channel 16 and communicate such information (e.g., QoS metric(s) associated with the communication channel 16) to the source device 12 in certain configuration data 212. In related aspects, the destination device 14 may determine and transmit (as part of the configuration data 212) the same type of QoS metrics regarding the communication channel 16 as were previously discussed as being determined by the source device 12. In further related aspects, the configuration data 212 may comprise a channel quality indication and/or a command or a request to the source device 12 to transition from capturing, encoding, and/or transmitting MV video data to capturing, encoding, and/or transmitting monoscopic video data, or vice versa.

The source device 12 and the destination device 14 may operate collaboratively (e.g., communicate information to one another) to determine whether the source device 12 should capture, encode, and/or transmit MV video and/or monoscopic video. Alternatively or additionally, the source device 12 and the destination device 14 may operate collaboratively to determine whether the destination device 14 should process, decode, and/or render MV video and/or monoscopic video. The collaborative determinations described above may be based at least in part on channel quality (e.g., QoS) of the communication channel 16, thereby ensuring an optimal experience by the user in view of dynamic conditions of the communication channel 16.

Figure 3A:
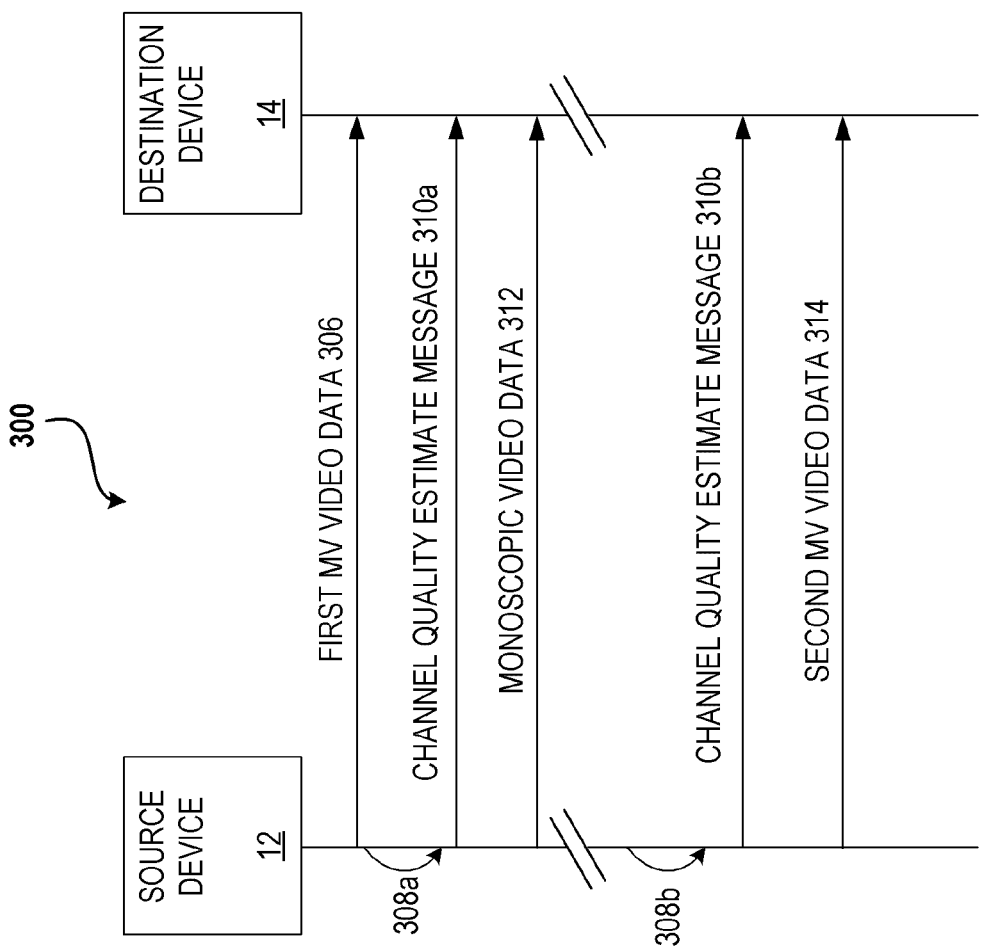
FIG. 3A is a signal flow diagram depicting communication of video data between a source device and a destination device, in accordance with an exemplary embodiment.

FIG. 3A depicts a signal flow diagram between the source device 12 and the destination device 14, according to one or more aspects of the present disclosure. The source device 12 and the destination device 14 may be communication with each other wirelessly (e.g., via the communication channel 16) and/or over wired connection(s).

The source device 12 may determine (e.g., receive or estimate) periodically or in a responsive fashion, at 308a, a channel quality estimate (e.g., a metric or other parameter indicative of the QoS) of the communication channel 16 utilized to transmit first MV video data 306, and may send a channel quality estimate message 310a (that includes the determined channel quality estimate) to the destination device 14. The channel quality estimate may also be referred to herein as simply the quality estimate. The channel quality estimate message 310a may be an example of, or alternatively be included as part of, the channel measurement data 210 in FIG. 2. The QoS provided by the communication channel 16 may be affected by characteristics of the environment in which the source device 12 and the destination device 14 operate within. For example, in certain high-density or high-traffic wireless communication environments, the QoS may degrade due to interference and/or limited bandwidth. In contrast, the QoS provided by the communication channel 16 may increase due to, for example, a decrease in the number of devices communicating in the environment and/or a decrease in the data traffic transmitted within the environment.

As shown in FIG. 3A, the source device 12 may use the channel quality estimate to autonomously (i.e., without any external input and/or instruction) adapt or adjust the capturing, encoding, and/or transmission of the first MV video data 306 via the communication channel 16 in order to provide the optimal video experience at the destination device 14. The determination (e.g., at 308a and/or at 308b) of the channel quality estimate may allow the source device 12 to adjust the capturing, coding, and/or transmission of the first MV video data 306 to the destination device 14.

For example, the source device 12 may determine whether the channel quality estimate meets or exceeds a threshold or level of channel quality (also referred to herein as channel quality threshold or channel quality level) deemed acceptable or optimal for transmission of MV video. If the quality estimate meets or exceeds the channel quality threshold or the level, the source device 12 may operate in MV video mode (e.g., transition operation to or continue operating in MV video mode). If the quality estimate is below the channel quality threshold or the level, the source device 12 may operate in monoscopic video mode (transition operation to or continue operating in monoscopic video mode). It is noted that the source device 12 may receive and consider other information in determining whether to operate in MV video mode or monoscopic video mode, such as, for example, a binocular disparity error estimate indicative of a rendering of MV video data at the destination device 14, as explained in further detail below. In further related aspects, the source device 12 may receive feedback message(s) (e.g., messages 352 and/or 362 in FIG. 3B) with commands or instructions to operate in MV video mode or monoscopic video mode, or to transition from one mode of operation to the other mode of operation.

When operating in MV video mode, the source device 12 may capture, code, and/or transmit MV video data in accordance with a MV/multi-layer standard (e.g., MV-HEVC, 3D-HEVC, and/or SHVC). In yet further related aspects, when operating in monoscopic video mode, the source device 12 may capture, code, and/or transmit monoscopic video data in accordance with a single-layer standard (e.g., H.264/MPEG-4 AVC and/or HEVC).

The source device 12 may transmit the channel quality estimate message 310a to the destination device 14 upon determining the channel quality at 308a. For example, the source device 12 may determine, at 308a, that the QoS (as determined based on the channel quality estimate) of the communication channel 16 has fallen below the channel quality threshold or level of quality deemed acceptable or optimal for transmission of MV video. Additionally or alternatively, this channel quality threshold or level may also be indicative of an acceptable level of video quality required at the destination device 14. Based on this determination of the QoS, the channel quality estimate message 310a may indicate, for example, that the source device 12 may transition from capturing, coding, and/or transmitting the first MV video data 306 to capturing, coding, and/or transmitting monoscopic video data (e.g., monoscopic video data 312 shown in FIG. 3A). In other words, the channel quality estimate message 310a may indicate that the source device 12 is transitioning from operating in a MV video mode to operating in a monoscopic video mode.

The channel quality estimate message 310a may be sent to the destination device 14 prior to and/or at the same time as the transmission of the monoscopic video data 312. It is noted that less data is needed to transmit a monoscopic version (e.g., monoscopic video data 312) of video data as compared to a MV version of the same video data. As such, the transmission of the monoscopic video data 312 instead of the first MV video data 306 may result in less video quality degradation at the destination device 14.

As further shown in FIG. 3A, at 308b, the source device 12, at a later time may again evaluate the channel quality of the communication channel 16. For example, the source device 12 may determine, based on the channel quality estimate determined at 308b, that the communication channel 16 may now be capable of providing a higher QoS than the QoS indicated by the quality estimate, determined at the earlier time at 308a. The source device 12 may also, or alternatively, determine based on the channel quality estimate determined at 308b that the QoS enabled (or provided) by the communication channel 16 will now be able to support transmission of MV video data such that the video quality will be acceptable at the destination device 14. For example, the source device 12 may determine, at 308b, that the QoS (as determined based on the channel quality estimate) of the communication channel 16 has risen such that the channel quality estimate meets or exceeds the channel quality threshold or the level described above.

The source device 12 may transmit a channel quality estimate message 310b to the destination device 14, which may include the channel quality estimate determined at 308b. The channel quality estimate message 310b may indicate, for example, that the capture, coding, and/or transmission of the monoscopic video data 312 may be transitioned to or replaced with the capture, coding, and/or transmission of MV video data (e.g., second MV video 314 illustrated in FIG. 3A).

Figure 3B:
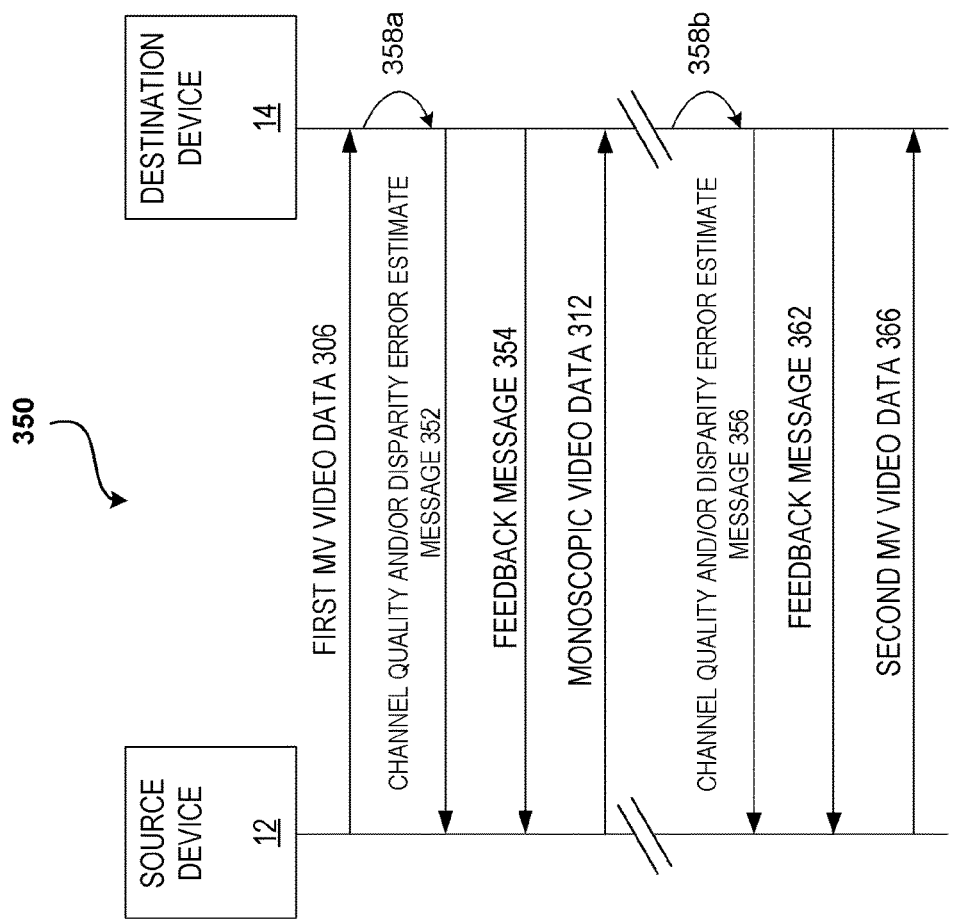
FIG. 3B is another signal flow diagram depicting communication of video data between a source device and a destination device, in accordance with an exemplary embodiment.

FIG. 3B depicts another signal flow diagram between the source device 12 and the destination device 14, according to one or more aspects of the present disclosure. As shown, a signal flow 350 is shown between the source device 12 and the destination device 14. The signal flow 350 is similar to the signal flow 300 in FIG. 3A with some differences. Alternative to or in addition to, receiving the channel quality estimate message (e.g., 310a and/or 310b) from the source device 12, the destination device 14 may determine a channel quality estimate and/or a binocular disparity error estimate at 358a.

The destination device 14 may transmit a channel quality estimate and/or a binocular disparity error estimate message 352 (also referred to herein as estimate(s) message 352) in addition to transmitting a feedback message 354 to the source device 12. In another example, the destination device 14 may transmit the estimate(s) message 352 as part of the feedback message 354. The estimate(s) message 352 may include a determination of and/or metric(s) indicative of the QoS of the communication channel 16, as perceived by the destination device 14. The feedback message 354 transmitted by the destination device 14 may provide the source device 12 with an indication of whether the destination device 14 can receive, decode, and/or render the MV video data 306, given the channel quality and/or the binocular disparity error determined by the destination device 14.

For example, the destination device 14 may indicate to the source device 12, via the estimate(s) message 352 and/or the feedback message 354, that the channel quality associated with the communication channel 16 as determined by the destination device 14 at 358a is below a channel quality threshold. In the alternative or in addition, the destination device 14 may indicate to the source device 12, via the estimate(s) message 352 and/or the feedback message 354, that the binocular disparity error estimate determined at 358a meets or exceeds a disparity error threshold. In response to such indication(s), the source device 12 may transition away from transmitting the MV video data 306 and/or transition toward transmitting monoscopic video data 312. In some embodiments, the feedback message 354 may comprise a command or request from the destination device 14 to the source device 12 to transition from capturing, coding, and/or transmitting MV video data and/or to transition to capturing, coding, and/or transmitting monoscopic video data, in response to the channel quality (as determined by the destination device 14) falling below the channel quality threshold and/or the binocular disparity error estimate meeting or exceeding the disparity error threshold.

As noted above, the feedback message 354 may comprise a request or command to the source device 12 to refrain from capturing, coding, and/or transmitting MV video data. Advantageously, the effect of the feedback message 354 may be that the source device 12 may conserve resources necessary to capture, encode, and/or transmit MV video data given that the destination device 14 is not capable of accurately receiving, decoding, and/or rendering, in light of the degraded communication channel quality and/or excessive binocular disparity error determined at 358a by the destination device 14.

The destination device 14 may continuously or periodically estimate the communication channel quality, such as, for example, at 358b. As before, the destination device 14 may transmit a channel quality estimate and/or binocular disparity error estimate message 356 and/or a feedback message 362 to the source device 12. In some embodiments, the feedback message 362 may comprise a command or request from the destination device 14 to the source device 12 to transition from capturing, coding, and/or transmitting monoscopic video data to capturing, coding, and/or transmitting MV video data, in response to the channel quality meeting or exceeding the channel quality threshold and/or the binocular disparity error estimate falling below the disparity error threshold.

When the channel quality estimate meets or exceeds above the channel quality threshold or level (and/or the binocular disparity error is below a disparity error threshold), the source device 12 may determine that MV video data may once again be supported by the communication channel 16 utilized by the source device 12 and the destination device 14. Accordingly, the source device 12 may cease or transition away from providing (i.e., capturing, encoding, and/or transmitting) monoscopic video data, and/or begin or transition toward providing MV video data (e.g., MV video data 366) to the destination device 14. In other words, the source device 12 may transition from operating in a monoscopic video mode to operating in a MV video mode.

With reference to FIGS. 3A-B, the source device 12 and the destination device 14 may collaboratively control the transition from transmitting the first MV video data 306 to the monoscopic video data 312, and/or the transition from transmitting the monoscopic video data 312 to either of the second MV video data 314 or second MV video data 366. In one embodiment, the source device 12 may be configured to determine a first channel quality estimate of the communication channel 16 utilized for transmission of the MV video data to the destination device 14 via a wireless network. The source device 12 may be configured to receive, from the destination device 14, a binocular disparity error estimate relating to a rendering of the MV video data 306 at the destination device 14 or another device in communication with the destination device 14. The source device 12 may be configured to receive a second channel quality estimate of the communication channel 16 from the destination device 14, and to determine whether to capture, encode, and/or transmit the MV video data 306 via the communication channel 16 based at least in part on the first channel quality estimate, the second channel quality estimate, and/or the binocular disparity error estimate.

In related aspects of the embodiment above, the source device 12 may be configured to transmit a first message to instruct the destination device 14 to transition to at least one of receive, decode, or render monoscopic video data in response to at least one of (i) the first channel quality estimate being below a channel quality threshold, (ii) the second channel quality estimate being below the channel quality threshold, and/or (iii) the binocular disparity error estimate meeting or exceeding a disparity error threshold. The source device 12 may be further configured to transmit a second message to instruct the destination device 14 to transition to at least one of receive, decode, or render the second MV video data 314 or the second MV video data 366 in response to a second channel quality estimate of the communication channel meeting or exceeding the channel quality threshold.

In another embodiment, the destination device 14 may be configured to determine a first channel quality estimate of the communication channel 16. The destination device 14 may be configured to determine a binocular disparity error estimate for a rendering of the MV video data at the destination device 14. The destination device 14 may be configured to receive a second channel quality estimate of the communication channel 16 from the source device 12, and to determine whether to receive, decode, and/or render the MV video data based at least in part on the first channel quality estimate, the second channel quality estimate, and/or the binocular disparity error estimate. It is noted that the techniques depicted in the two signal flows 300, 350 may be implemented separately or in conjunction with each other.

In related aspects of the embodiment above, the destination device 14 may be configured to transmit a first message to instruct the source device 12 to transition to at least one of capture, encode, or transmit monoscopic video data, in response to at least one of (i) the first channel quality estimate being below a channel quality threshold, (ii) the second channel quality estimate being below the channel quality threshold, or (iii) the binocular disparity error estimate meeting or exceeding a disparity error threshold. The destination device 14 may be further configured to transmit a second message to instruct the source device 12 to transition to at least one of capture, encode, or transmit the second MV video data 314 or the second MV video data 366 in response to a second channel quality estimate of the communication channel meeting or exceeding the channel quality threshold.

Figure 4:
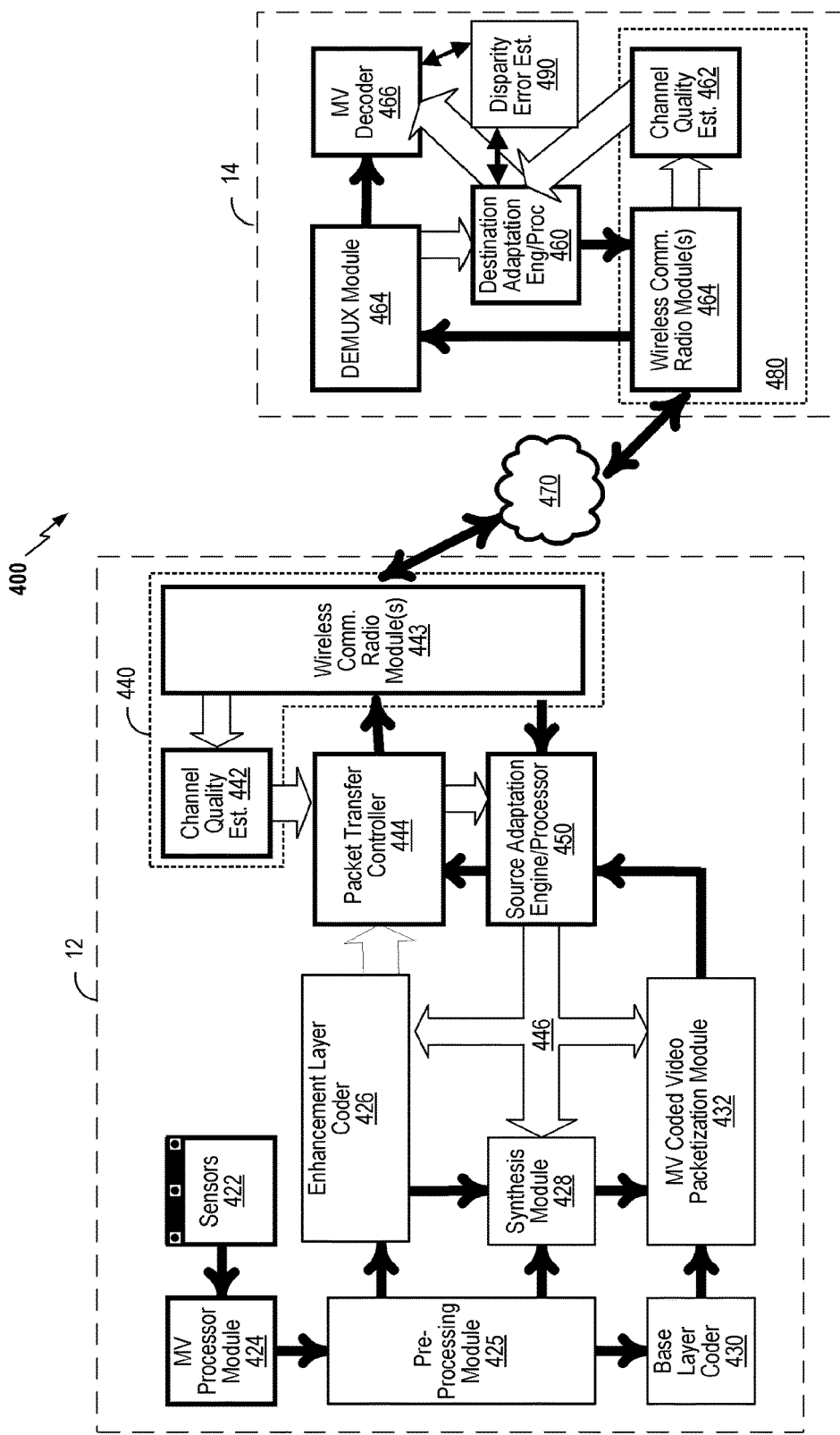
FIG. 4 is a is a flowchart of an embodiment of a video source transmitting MV video to a destination device, in accordance with an exemplary embodiment.

FIG. 4 is a system block diagram of an exemplary embodiment of a system 400 that includes a source device 12 transmitting MV video data to a destination device 14. The source device 12 may comprise a sensor platform 422 (e.g., the video source 18 in FIG. 1) and various components configured for the capture, synthesis, processing, and/or encoding of video data prior to transmission of the video data to the destination device 14. The video data captured via image sensor(s) of the sensor platform 422 may be provided to a MV-capable video processor module 424 (e.g., the encoder 20 in FIG. 1), which may include multispectral MV processor(s), multimedia processor(s), and/or multimedia accelerator(s), and then to a pre-processing module 425. The captured video data may undergo various enhancements at an enhancement layer coder 426 (that may include, e.g., an inter-view coder and/or a depth estimation component), and may be provided to a video synthesis module 428, and a base layer coding module 430. The video synthesis module 428 and the base layer coding module 430 may further process the video data and provide the processed video data to a MV coded video packetization module 432 that packetizes the processed and encoded video data. It is noted that component(s) of the source device 12, and component(s) thereof, may be configured to capture, process, encode, and/or facilitate the transmission of the MV video data and/or monoscopic video data. As such, the source device 12 is capable of providing both MV video data and monoscopic video data. A module may include analog and/or digital technologies and may include one or more multimedia signal processing systems, such as video encoders/decoders, using encoding/decoding methods based on international standards such as, for example, the MPEG-x and H.26x standards.

The source device 12 may further comprise a source wireless communication subsystem 440. The source wireless communication subsystem 440 may comprise wireless communication radio module(s) 443, such as, for example, a WWAN radio module and/or a WLAN radio module for transmitting and/or receiving data via a wireless network 470.

The subsystem 440 may also comprise a channel quality estimator 442 configured to determine the quality (e.g., QoS) of wireless communication channel(s) of the wireless network 470. The channel estimator 442 may be in communication with a packet transfer controller 444 and a source adaptation engine 450 (also referred to as a source adaptation processor).

The source adaptation engine 450 may receive packetized MV video data from the MV coded video packetization module 432, as well as channel quality estimate(s) (e.g., the channel quality estimates 310a, 352 in FIGS. 3A-B) from the channel quality estimator 422 (and/or a channel quality estimator 462 of the destination device 14 described in further detail below). The source adaptation engine 450 may determine whether the channel quality estimate(s) for communication channel(s) of the wireless network 470 are sufficient to support satisfactory transmission the MV video data to the destination device 14. For example, the determination of whether the MV video data transmission is satisfactory may be based at least in part on whether the channel quality estimate (e.g., provided by the channel quality estimator(s) 422 and/or 462) meets or exceeds a channel quality threshold. Such a determination may be made autonomously by the adaptation engine 450 and/or in response to additional information or messaging received from the destination device 14 (e.g., a destination adaptation engine 460 described in further detail below).

As noted above, the source adaptation engine 450 may provide feedback 446 to other component(s) of the source device 12 (e.g., the enhancement layer coder 426, the video synthesis module 428, and/or the packetization module 432) to adjust the capture and/or processing of video data. If the channel quality estimator 442 determines that the channel quality estimate of a communication channel 16 of the wireless network 470 has degraded and fallen below the channel quality threshold, then the adaptation engine 450 may provide feedback information 446, which may comprise a command to refrain from capturing, coding, and/or transmitting MV video data, and/or a command to capture, code, and/or transmit monoscopic video data. Similarly, should the channel quality estimate meet or exceed the channel quality threshold, the adaptation engine 450 may provide, as part of the feedback information 446, a command to the other component(s) of the source device 12 to capture and/or process MV video data.

The MV video data may be transmitted via the wireless network 470 to the destination device 14. The destination device 14 may comprise a wireless communication subsystem 480. The subsystem 480 may control the receiving and transferring of the incoming video data and perform functions similar to the I/O controller 28 in FIG. 1. The subsystem 480 may comprise wireless communication radio module(s) 464, such as, for example, a WWAN radio module and/or a WLAN radio module.

The subsystem 480 may comprise also comprise a channel quality estimator 462 configured to estimate the quality of wireless communication channel(s) of the wireless network 470. The channel quality estimator 462 may communicate the channel quality estimate(s) to the destination adaptation engine 460 (also referred to as a destination adaptation processor).

The destination device 14 may further comprise a demultiplexer module 464 and a MV video decoder 466 that receives the incoming video data via the wireless communication radio module(s) 464. The demultiplexer module 464 may be configured to demultiplex and reassemble the packetized MV video data. The MV video decoder 466 may be configured to decode the reassembled MV video data for subsequent processing and/or rendering at the destination device 14.

The destination device 14 may further comprise a disparity error estimator 490 that is communication with the MV decoder 466 and the destination adaptation engine 460. The disparity error estimator 490 (e.g., in conjunction with the destination adaptation engine 460) may determine or calculate an estimate of the binocular disparity error in the rendered MV video. For example, the disparity error estimator 490 may comprise or communicate with a 3D display panel, 3D glasses or goggles, sensors, and/or a user input module (e.g., a touchscreen configured to receive user input regarding the 3D quality of the rendered MV video).

The destination adaptation engine 460 may receive channel quality estimate(s) from the channel quality estimator 462 and/or binocular disparity error estimate(s) from the disparity error estimator 490. The destination adaptation engine 460 may be configured to provide feedback information comprising or regarding the estimated channel quality and/or disparity error to the source device 12 via the wireless network 470 and/or a different wireless network. In some embodiments, the destination adaptation engine 460 may provide the feedback information to the source adaptation engine 450 and/or the channel quality estimator 442 of the source device 12. In one example, the source adaptation engine 450 may determine whether MV video data or monoscopic video data should be captured, encoded, and/or transmitted by the source device 12 based on: the channel quality estimate(s) from the channel quality estimator 442 and/or the channel quality estimator 462; and/or the binocular disparity error estimate(s) from the disparity error estimator 490. In the alternative or in addition, the source adaptation engine 450 may determine whether MV video data or monoscopic video data should be processed, decoded, and/or rendered by the destination device 14 based on such channel quality estimate(s) and/or binocular disparity error estimate(s), and may send command(s) and/or channel quality/binocular disparity information to the destination device 14 based on the determination.

Similarly, the source adaptation engine 450 may be configured to provide feedback information comprising or regarding the estimated channel quality (e.g., from the channel quality estimator 442) to the destination device 14 via the wireless network 470 and/or a different wireless network. In some embodiments, the source adaptation engine 450 may provide the feedback information to the destination adaptation engine 460 and/or the channel quality estimator 442 of the destination device 14. In one example, the destination adaptation engine 460 may determine whether MV video data or monoscopic video data should be processed, decoded, and/or rendered by the destination device 14 based on: the channel quality estimate(s) from the channel quality estimator 442 and/or the channel quality estimator 462; and/or the binocular disparity error estimate(s) from the disparity error estimator 490. In the alternative, or in addition, the destination adaptation engine 460 may determine whether MV video data or monoscopic video data should be captured, encoded, and/or transmitted by the source device 12 based on such channel quality estimate(s) and/or binocular disparity error estimate(s), and may send command(s) and/or channel quality/binocular disparity information to the source device 12 based on the determination.

Figure 5:
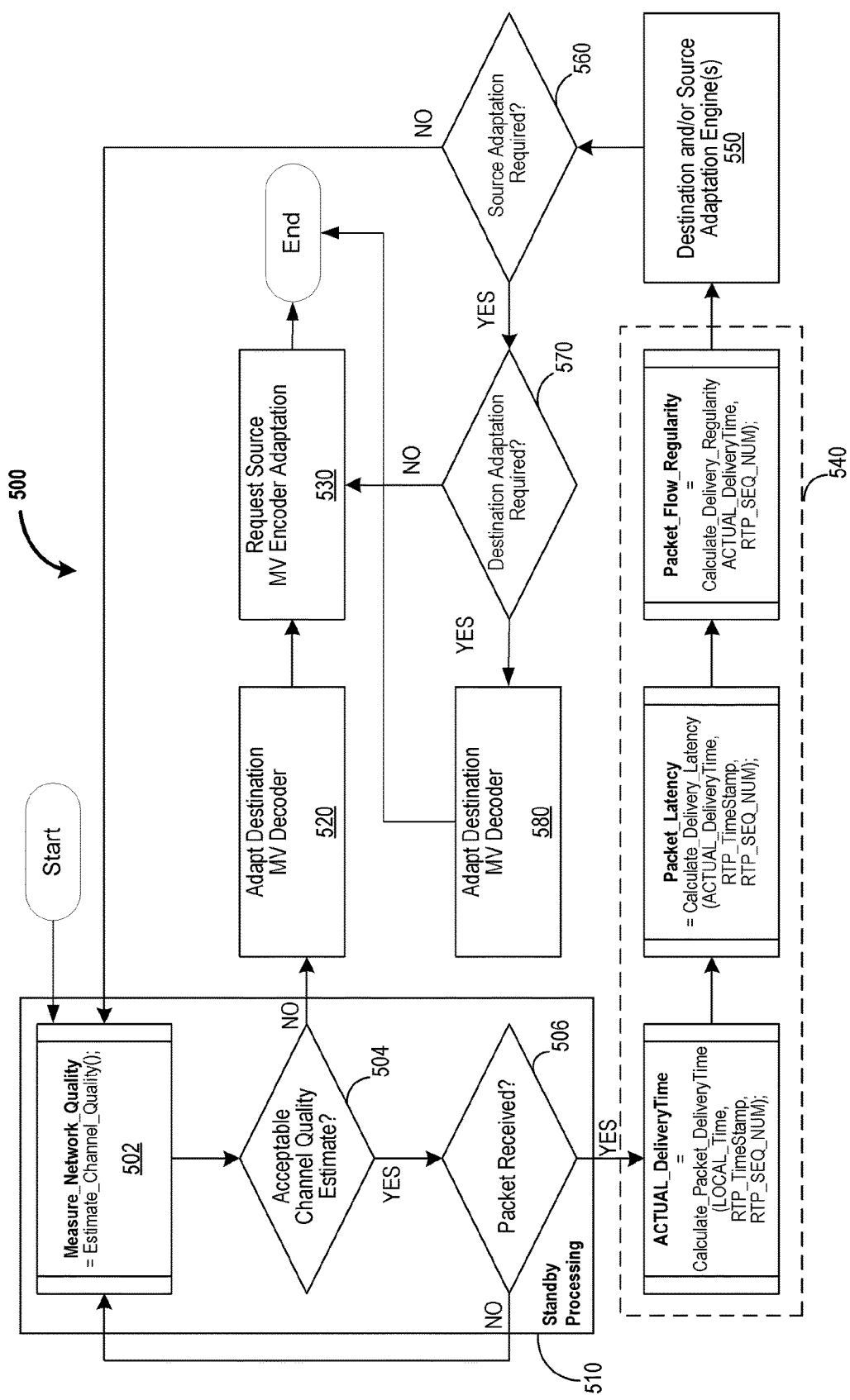
FIG. 5 is a flowchart depicting a method of transmission of MV video data, in accordance with an exemplary embodiment.

FIG. 5 is a flowchart depicting an example method of transitioning between MV video and monoscopic video in response to changes in the estimates or indications of the channel quality of the communication channel 16 utilized by the source device 12 and the destination device 14, for illustrative purposes. As noted above, the estimates, indications, or metrics regarding the channel quality may include but are not limited to interference, signal-to-noise ratio, data rate, delay, delay-violation probability, packet-loss probability, actual packet delivery time, packet latency, packet flow regularity, etc.

As shown, there is provided an example method 500 that starts at block 502 and involves measuring or estimating indication(s) of a channel quality of the communication channel 16. The method 500 moves to decision block 504 that involves determining whether the channel quality estimate is acceptable (e.g., based on whether the channel quality estimate meets or exceeds a channel quality threshold). If the channel quality estimate is determined to be acceptable, then the method 500 moves to decision block 506, which may involve determining whether MV video data packet(s) are received. If, at decision block 506, a determination is made that MV video data packet(s) are not received, the method 500 proceeds to block 502 for standby processing operation. It is noted that blocks 502, 504, and 506 may be performed at the source device 12 and/or the destination device 14. It is further noted that blocks 502, 504, and 506 may be collectively part of a standby processing operation 510 of a MV video system.

If the channel quality estimate is determined not to be acceptable, as determined at block 504, then the method 500 moves to block 520 that may involve adapting a MV video decoder at the destination device 14, which in turn may involve, for example, refraining from decoding MV video data, and/or transitioning toward or commencing the decoding of monoscopic video data if available. The method 500 then advances to block 530 that involves requesting or instructing the source device 12 to adapt the MV video encoder in view of the poor channel conditions. Adaptation of the MV video encoder of the source device 12 may involve, for example, having the the source device 12 refrain from capturing MV video data and/or encoding captured MV video data as well as, or alternatively, transitioning to encoding captured monoscopic video data. It is noted that block 530 may more generally involve having the source device 12 refrain from capturing, encoding, and/or transmitting MV video data and/or transition to capturing, encoding, and/or transmitting monoscopic video data. It is also noted that block 520 and/or 530 are typically performed at the destination device 14.

Returning to decision block 506, if it is determined that MV video data packet(s) are received, then the method 500 advances to block 540 that may involve evaluating the received MV video data packet(s) based on numerous criteria, including but not limited to, for example, actual delivery time, packet latency, and/or packet flow regularity. In the alternative or in addition, other channel quality metrics (e.g., data rate, delay-violation probability, packet-loss probability, etc.) may be determined and considered at block 540. It is noted that the evaluation of such criteria may be used to estimate a channel quality (e.g., QoS) of the communication channel 16 used by the source device 12 and destination device 14, and/or may be used in estimating a binocular disparity error observed at the destination device 14. Block 540 may be performed at the destination device 14 and/or the source device 12. Example code for implementing blocks 502 and 540 are provided in FIG. 5.

The method 500 may then advance to, at block 550, a destination adaptation engine 460 at the destination device 14 and/or a source adaptation engine 450 at the source device 12. The destination and/or source adaptation engine(s) may determine, at decision block 560, whether adaptation of the source device 12 is required. If adaptation of the source device 12 is required, the method 500 moves to decision block 570; if adaptation of the source device 12 is not required, the method proceeds to block 502 for standby processing. At decision block 570, the destination and/or source adaptation engine(s) may determine whether adaptation of the destination device 14 is required. If adaptation of the destination device 14 is required, the method 500 proceeds to block 580 and then end. If adaptation of the destination device 14 is not required, the method 500 proceeds to block 530 and then end.

Figure 6:
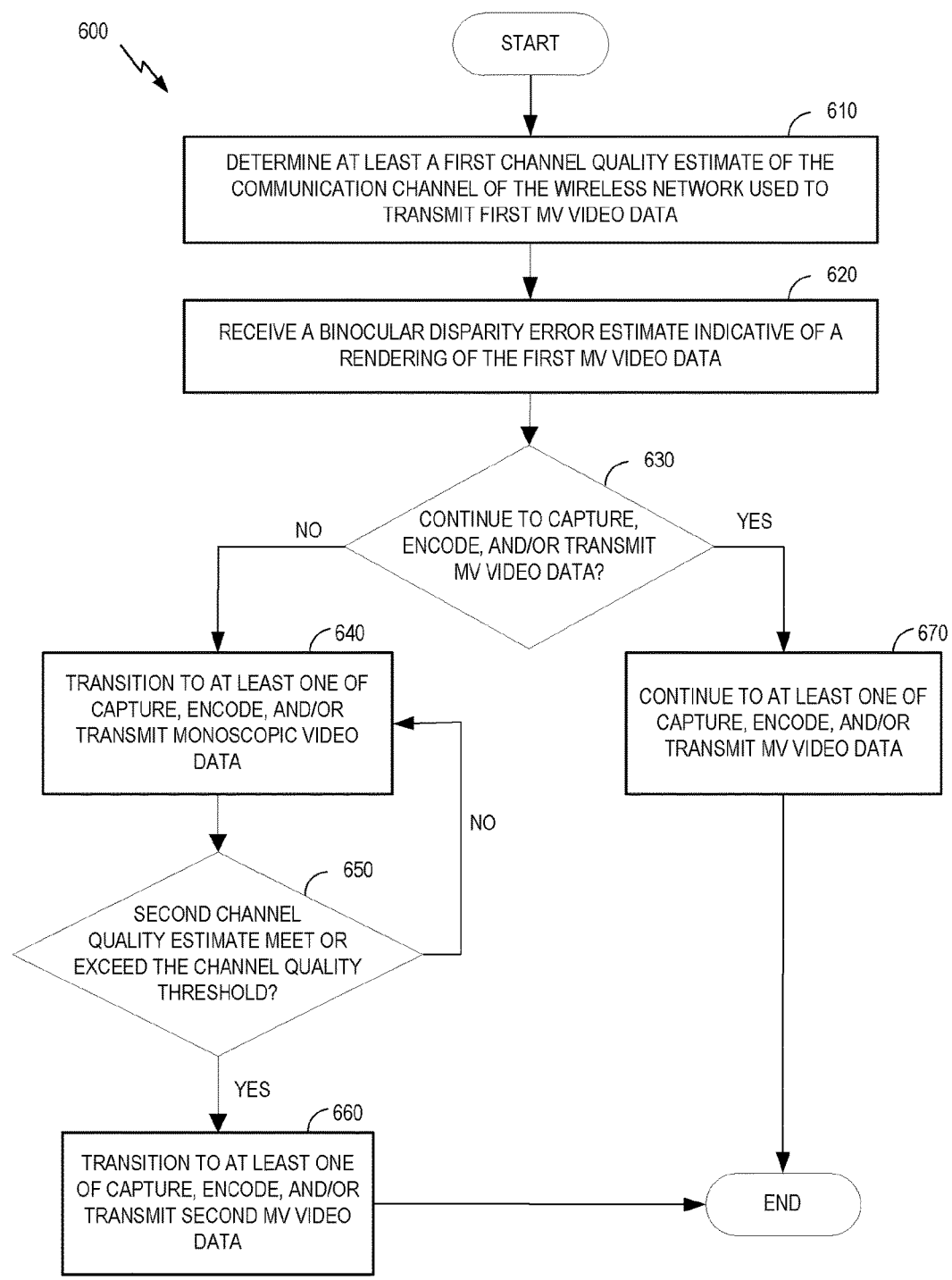
FIG. 6 illustrates an example methodology operable by a source device.

With reference to FIG. 6, illustrated is a methodology 600 for transmission of video data that be performed by the source device 12 or component(s) thereof. The method 600 may start at 610, which may involve determining at least a first channel quality estimate of the communication channel 16 of the wireless network used to transmit first MV video data. Block 610 may be performed, for example, by the channel quality estimator 442 at the source device 12.

The method 600 may involve, at 620, receiving a binocular disparity error estimate indicative of a rendering of the first MV video data. Block 620 may be performed, for example, by the wireless communication subsystem 440 (e.g., including a WLAN and/or a WWAN radio module) and/or the I/O controller 22 at the source device 12.

The method 600 may involve, at 630, determining whether to continue to at least one of capture, encode, and/or transmit MV video data based at least in part on the first channel quality estimate and/or the binocular disparity error estimate. Decision block 630 may be performed, for example, by the source adaptation engine 450 at the source device 12.

In related aspects, decision block 630 may involve determining whether (i) the first channel quality estimate is below a channel quality threshold and/or (ii) the binocular disparity error estimate meets or exceeds a disparity error threshold.

In one example, the answer to decision block 630 may be NO (i.e., the decision is to no longer continue to at least one of capture, encode, and/or transmit MV video data) if the answer to both determinations (i) or (ii) is YES. In another example, the answer to decision block 630 may be NO if the answer to either determinations (i) or (ii) is YES.

Alternatively, the answer to decision block 630 may be YES (i.e., the decision is to continue to at least one of capture, encode, and/or transmit MV video data) if the answer to both determinations (i) and (ii) is NO. In another example, the answer to decision block 630 may be YES if the answer to either determinations (i) or (ii) is NO.

If the answer to decision block 630 is NO, the method 600 may proceed to block 640. The method 600 may involve, at 640, transitioning to at least one of capture, encode, and/or transmit monoscopic video data (e.g., in response to at least one of (i) the first channel quality estimate being below a channel quality threshold and/or (ii) the binocular disparity error estimate meeting or exceeding a disparity error threshold). Block 640 may be performed, for example, by the video source 18, the video encoder 20, and/or the I/O controller 22 at the source device 12.

The method 600 may proceed to decision block 650, which may involve determining whether a second channel quality estimate of the communication channel 16 meets or exceeds the channel quality threshold. Decision block 650 may be performed, for example, by the source adaptation engine 450 at the source device 12. If the answer to decision block 650 is NO (i.e., the second channel quality estimate does not meet or exceed the channel quality threshold), the method 600 may proceed to block 640. If the answer to decision block 650 is YES (i.e., the second channel quality estimate meets or exceeds the channel quality threshold), the method 600 may proceed to block 660. Block 660 may involve transitioning to at least one of capture, encode, and/or transmit second MV video data. Block 660 may be performed, for example, by the video source 18, the video encoder 20, and/or the I/O controller 22 at the source device 12. The method 600 may end after block 660.

If the answer to decision block 630 is YES, the method 600 may proceed to block 670, which may involve continuing to at least one of capture, encode, and/or transmit MV video data, and then end. Block 670 may be performed, for example, by the video source 18, the video encoder 20, and/or the I/O controller 22 at the source device 12.

In related aspects, the method 600 may further involve determining a subsequent or third channel quality estimate and/or receiving a subsequent binocular disparity error estimate indicative of a rendering of the second MV video data. The method 600 may also involve determining whether to continue to at least one of capture, encode, and/or transmit MV video data based at least in part on the third channel quality estimate and/or the subsequent binocular disparity error estimate, and then end.

Figure 7:
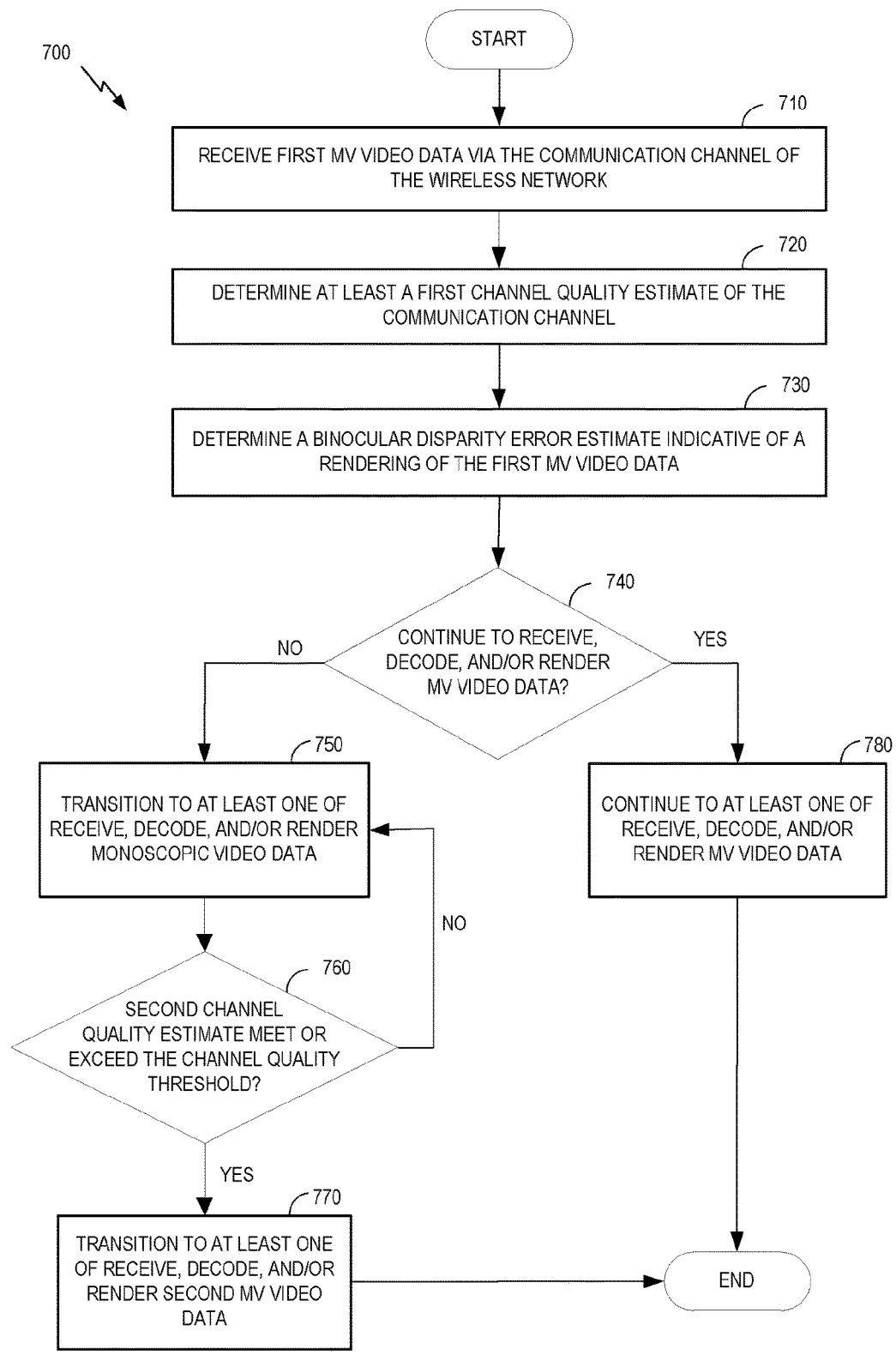
FIG. 7 illustrates an example methodology operable by a destination device.

With reference to FIG. 7, illustrated is a methodology 700 for receiving video data that may be performed by a destination device 14 or component(s) thereof. The method 700 may start at 710, which may involve receiving first MV video data via the communication channel 16 of the wireless network. Block 710 may be performed, for example, by the wireless communication subsystem 480 (e.g., including a WLAN and/or a WWAN radio module) and/or I/O controller 28 at the destination device 14.

The method 700 may involve, at 720, determining at least a first channel quality estimate of the communication channel 16. Block 720 may be performed, for example, by the channel quality estimator 462 at the destination device 14.

The method 700 may involve, at 730, determining a binocular disparity error estimate indicative of a rendering of the first MV video data. Block 730 may be performed, for example, by the disparity error estimator 490 and/or the destination adaptation engine 460 at the destination device 14.

The method 700 may involve, at 740, determining whether to continue to at least one of receive, decode, and/or render MV video data based at least in part on the first channel quality estimate and/or the binocular disparity error estimate. Decision block 740 may be performed, for example, by the destination adaptation engine 460 at the destination device 14.

In related aspects, decision block 740 may involve determining whether (i) the first channel quality estimate is below a channel quality threshold and/or (ii) the binocular disparity error estimate meets or exceeds a disparity error threshold.

In one example, the answer to decision block 740 may be NO (i.e., the decision is to no longer continue to at least one of receive, decode, or render MV video data) if the answer to both determinations (i) and (ii) is YES. In another example, the answer to decision block 740 may be NO if the answer to either determinations (i) or (ii) is YES.

Alternatively, the answer to decision block 740 may be YES (i.e., the decision is to continue to at least one of receive, decode, or render MV video data) if the answer to both determinations (i) and (ii) is NO. In another example, the answer to decision block 740 may be YES if the answer to either determinations (i) or (ii) is NO.

If the answer to decision block 740 is NO, the method 700 may proceed to block 750. The method 700 may involve, at 750, transitioning to at least one of receive, decode, or render monoscopic video data (e.g., in response to at least one of (i) the first channel quality estimate being below a channel quality threshold and/or (ii) the binocular disparity error estimate meeting or exceeding a disparity error threshold). Block 750 may be performed, for example, by the I/O controller 22, the video decoder 30, and/or the display device 32 at the destination device 14.

The method 700 may proceed to decision block 760, which may involve determining whether a second channel quality estimate of the communication channel 16 meets or exceeds the channel quality threshold. Decision block 760 may be performed, for example, by the destination adaptation engine 460 at the destination device 14. If the answer to decision block 760 is NO, the method 700 may proceed to block 750. If the answer to decision block 760 is YES, the method 700 may proceed to block 770. Block 770 may involve transitioning to at least one of receive, decode, or render second MV video data. Block 770 may be performed, for example, by the I/O controller 22, the video decoder 30, and/or the display device 32 at the destination device 14. The method 700 may end after block 770.

If the answer to decision block 740 is YES, the method 700 may proceed to block 780, which may involve continuing to at least one of receive, decode, and/or render MV video data, and then end. Block 780 may be performed, for example, by the I/O controller 22, the video decoder 30, and/or the display device 32 at the destination device 14.

In related aspects, the method 700 may further involve determining a subsequent or third channel quality estimate and/or receiving a subsequent binocular disparity error estimate indicative of a rendering of the second MV video data. The method 700 may also involve determining whether to continue to at least one of receive, decode, or render MV video data based at least in part on the third channel quality estimate and/or the subsequent binocular disparity error estimate, and then end.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such embodiment decisions should not be interpreted as causing a departure from the scope of the embodiments of the disclosure.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus for transmission of video data via a wireless network, comprising:
    at least one processor configured to encode and transmit a first portion of the video data as multi-view video data to a destination device via the wireless network; and
    an input/output (I/O) controller configured to receive, from the destination device and in response to transmission of the first portion of the video data as multi-view video data, an error value indicative of a depth distortion determined based on rendering of the first portion of the video data as multi-view video data at the destination device,
    wherein the at least one processor is further configured to determine whether to encode or transmit a second portion of the video data as multi-view video data or to encode or transmit the second portion of the video data as monoscopic video data based on a comparison between the error value associated with rendering of the first portion of the video data as multi-view video data and a threshold error value indicative of a level of depth distortion at which the at least one processor transitions between processing portions of the video data as multi-view video data or as monoscopic video data.

2. The apparatus of claim 1, wherein the at least one processor is further configured to:
    determine, prior to transmission of the second portion of the video data, a first channel quality estimate indicative of a quality of service associated with a communication channel of the wireless network used to transmit the first portion of the video data; and
    transition to encode or transmit the second portion of the video data as monoscopic video data in response to at least one of (i) the first channel quality estimate being below a channel quality threshold or (ii) the error value meeting or exceeding the threshold error value, wherein the channel quality threshold is indicative of a level of the quality of service associated with the communication channel at which the at least one processor transitions between processing portions of the video data as multi-view video data or as monoscopic video data.

3. The apparatus of claim 2, wherein the at least one processor is further configured to encode or to transmit the second portion of the video data as multi-view video data in response to at least one of (i) the first channel quality estimate meeting or exceeding the channel quality threshold or (ii) the error value being below the threshold error value.

4. The apparatus of claim 2, wherein the at least one processor is further configured to transmit a first message to instruct the destination device to transition to receive, decode, or render portions of the video data as monoscopic video data in response to at least one of (i) the first channel quality estimate being below the channel quality threshold or (ii) the error value meeting or exceeding the threshold error value.

5. The apparatus of claim 4, wherein the at least one processor is further configured to transmit a second message to instruct the destination device to transition to receive, decode, or render portions of the video data as multi-view video data in response to a second channel quality estimate of the communication channel meeting or exceeding the channel quality threshold.

6. A method for transmission of video data via a wireless network, comprising:
   encoding or transmitting, as multi-view video data, a first portion of the video data to a destination device via the wireless network;
   receiving, from the destination device and in response to transmission of the first portion of the video data as multi-view video data, an error value indicative of a depth distortion determined based on rendering of the first portion of the video data as multi-view video data at the destination device; and
   determining whether to encode or transmit a second portion of the video data as multi-view video data or to encode or transmit the second portion of the video data as monoscopic video data based on a comparison between the error value associated with rendering of the first portion of the video data as multi-view video data and a threshold error value indicative of a level of depth distortion at which processing of the video data transitions between processing portions of the video data as multi-view video data or as monoscopic video data.

7. The method of claim 6, further comprising;
   determining, prior to transmission of the second portion of the video data, a first channel quality estimate indicative of a quality of service associated with a communication channel of the wireless network used to transmit the first portion of video data; and
   transitioning to encoding or transmitting the second portion of the video data as monoscopic video data in response to at least one of (i) the first channel quality estimate being below a channel quality threshold or (ii) the error value meeting or exceeding the threshold error value, wherein the channel quality threshold is indicative of a level of the quality of service associated with the communication channel at which processing transitions between processing portions of the video data as multi-view video data or as monoscopic video data.

8. The method of claim 7, further comprising encoding or transmitting of the second portion of the video data as multi-view video data in response to at least one of (i) the first channel quality estimate meeting or exceeding the channel quality threshold or (ii) the error value being below the threshold error value.

9. The method of claim 7, further comprising transmitting a first message to instruct the destination device to transition to receive, decode, or render portions of the video data as monoscopic video data in response to at least one of (i) the first channel quality estimate being below the channel quality threshold or (ii) the error value meeting or exceeding the threshold error value.

10. The method of claim 9, further comprising transmitting a second message to instruct the destination device to transition to receive, decode, or render portions of the video data as multi-view video data in response to a second channel quality estimate of the communication channel meeting or exceeding the channel quality threshold.

11. An apparatus for receiving video data via a wireless network, comprising:
   an input/output (I/O) controller configured to receive a first portion of the video data as multi-view video data via the wireless network; and
   at least one processor configured to:
      instruct a display device to render the first portion of the video data as multi-view video data,
      determine an error value indicative of a depth distortion determined based on rendering of the first portion of the video data as multi-view video data,
      communicate the determined error value to a source device of the video data, and
      determine whether to at least one of receive, decode, or render a second portion of the video data as multi-view video data or to at least or one receive, decode, or render the second portion of the video data as monoscopic video data based on a comparison between the error value associated with rendering of the first portion of the video data as multi-view video data and a threshold error value indicative of a level of depth distortion at which the at least one processor transitions between processing portions of the video data as multi-view video data or as monoscopic video data.

12. The apparatus of claim 11, wherein the at least one processor is further configured to:
   determine, prior to rendering a second portion of the video data, a first channel quality estimate indicative of a quality of service associated with a communication channel of the wireless network used to receive the first portion of the video data; and
   transition to at least one of receive, decode, or render the second portion of the video data as monoscopic video data in response to at least one of (i) the first channel quality estimate being below a channel quality threshold or (ii) the error value meeting or exceeding the threshold error value, wherein the channel quality threshold is indicative of a level of the quality of service associated with the communication channel at which the at least one processor transitions between processing portions of the video data as multi-view video data or as monoscopic video data.

13. The apparatus of claim 12, wherein the at least one processor is further configured to at least one of receive, decode, or render the second portion of the video data as multi-view video data in response to at least one of (i) the first channel quality estimate meeting or exceeding the channel quality threshold or (ii) the error value being below the threshold error value.

14. The apparatus of claim 12, wherein the at least one processor is further configured to transmit a first message to instruct a source device to transition to encode or transmit portions of the video data as monoscopic video data in response to at least one of (i) the first channel quality estimate being below the channel quality threshold or (ii) the error value meeting or exceeding the threshold error value.

15. The apparatus of claim 14, wherein the at least one processor is further configured to transmit a second message to instruct the source device to transition to encode or transmit portions of the video data as multi-view (MV) video data in response to a second channel quality estimate of the communication channel meeting or exceeding the channel quality threshold.

16. A method for receiving video data via a wireless network, comprising:
- receiving, at a destination device, a first portion of the video data as multi-view video data via the wireless network;
- rendering the first portion of the video data as multi-view video data on a display device;
- determining an error value indicative of a depth distortion determined based on rendering of the first portion of the video data as multi-view video data on the display device;
- communicating the determined error value to a source device of the video data; and
- determining whether to at least one of receive, decode, or render a second portion of the video data as multi-view video data or as monoscopic video data based on a comparison between the error value associated with rendering of the first portion of the video data as multi-view video data and a threshold error value indicative of a level of depth distortion at which the destination device transitions between processing portions of the video data as multi-view video data or as monoscopic video data.

17. The method of claim 16, further comprising:
- determining, prior to rendering a second portion of the video data, a first channel quality estimate indicative of a quality of service associated with a communication channel of the wireless network used to receive the first portion of the video data; and
- transitioning to at least one of receiving, decoding, or rendering the second portion of the video data as monoscopic video data in response to at least one of (i) the first channel quality estimate being below a channel quality threshold or (ii) the error value meeting or exceeding the threshold error value, wherein the channel quality threshold is indicative of a level of the quality of service associated with the communication channel at which the at least one processor transitions between processing portions of the video data as multi-view video data or as monoscopic video data.

18. The method of claim 17, further comprising to at least one of receive, decode, or render the second portion of the video data as multi-view video data in response to at least one of (i) the first channel quality estimate meeting or exceeding the channel quality threshold or (ii) the error value being below the threshold error value.

19. The method of claim 17, further comprising transmitting a first message to instruct a source device to transition to encode or transmit portions of the video data as monoscopic video data in response to at least one of (i) the first channel quality estimate being below the channel quality threshold or (ii) the error value meeting or exceeding the threshold error value.

20. The method of claim 19, further comprising transmitting a second message to instruct the source device to transition to encode or transmit portions of the video data as multi-view (MV) video data in response to a second channel quality estimate of the communication channel meeting or exceeding the channel quality threshold.

* * * * *